US011953588B2

(12) United States Patent
Mochizuki et al.

(10) Patent No.: US 11,953,588 B2
(45) Date of Patent: Apr. 9, 2024

(54) GROUND-PENETRATING RADAR DEVICE AND METHOD FOR SAME

(71) Applicant: Nippon Telegraph and Telephone Corporation, Tokyo (JP)

(72) Inventors: Shoji Mochizuki, Musashino (JP); Soichi Oka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 713 days.

(21) Appl. No.: 17/058,366

(22) PCT Filed: May 28, 2019

(86) PCT No.: PCT/JP2019/021028
§ 371 (c)(1),
(2) Date: Nov. 24, 2020

(87) PCT Pub. No.: WO2019/230696
PCT Pub. Date: Dec. 5, 2019

(65) Prior Publication Data
US 2021/0199795 A1 Jul. 1, 2021

(30) Foreign Application Priority Data
May 28, 2018 (JP) .............................. 2018-101262

(51) Int. Cl.
*G01S 13/88* (2006.01)
*G01S 7/03* (2006.01)
(Continued)

(52) U.S. Cl.
CPC ............ *G01S 13/885* (2013.01); *G01S 7/032* (2013.01); *H01Q 3/04* (2013.01); *H01Q 21/08* (2013.01)

(58) Field of Classification Search
CPC ......... G01S 13/885; G01S 7/032; G01V 3/12; H01Q 1/04; H01Q 21/064; H01Q 21/065; H01Q 21/08; H01Q 3/04
See application file for complete search history.

(56) References Cited

U.S. PATENT DOCUMENTS

2004/0246183 A1* 12/2004 Chandler ............. H01Q 21/061
343/701
2016/0294196 A1* 10/2016 Tani ..................... H01Q 21/061
(Continued)

FOREIGN PATENT DOCUMENTS

JP     2006-47132 A    2/2006
JP     3936472 B2      3/2007
(Continued)

OTHER PUBLICATIONS

International Search Report dated Aug. 20, 2019, issued in PCT Application No. PCT/JP2019/021028, filed May 28, 2019.
(Continued)

*Primary Examiner* — Timothy X Pham
(74) *Attorney, Agent, or Firm* — Workman Nydegger

(57) ABSTRACT

An underground radar device and a method thereof are provided that do not require replacement of antennas for transceiving in conformity with the width of a road, and can achieve exploration of a buried object with a single scan. An underground radar device includes a transmission array antenna and a reception array antenna, and further includes a position variable mechanism capable of changing intervals between antenna elements of the transmission array antenna and the reception array antenna while keeping all the intervals equal. The position variable mechanism includes a drive unit, a plurality of crossbars constituting an expandable link, (Continued)

and a plurality of link sections for coupling so as to change inclination angles of a V-shape and an inverted V-shape of the expandable link.

5 Claims, 8 Drawing Sheets

(51) Int. Cl.
*H01Q 3/04* (2006.01)
*H01Q 21/08* (2006.01)

(56) References Cited

U.S. PATENT DOCUMENTS

| | | | |
|---|---|---|---|
| 2017/0170559 A1* | 6/2017 | van de Water | H01Q 3/38 |
| 2018/0145400 A1* | 5/2018 | Gabriel | H01Q 19/20 |
| 2019/0237871 A1* | 8/2019 | Berg | H01Q 3/2617 |
| 2021/0364614 A1* | 11/2021 | Loesch | G01S 13/42 |

FOREIGN PATENT DOCUMENTS

| | | |
|---|---|---|
| JP | 2008-275591 A | 11/2008 |
| JP | 2017-215185 A | 12/2017 |

OTHER PUBLICATIONS

3D-Radar, *Multi-Channel, Ground-Coupled Antenna Arrays for GPR*, Web Literature, May 11, 2018 (reading day), http://WWW.3d-radar.com/?page id=51, pp. 1-2.

* cited by examiner

GROUND-PENETRATING RADAR DEVICE AND METHOD FOR SAME

TECHNICAL FIELD

The present invention relates to an underground radar device that explores a buried object buried in the underground, and to a method thereof.

BACKGROUND ART

There are many buried objects under roads, such as sidewalks and roadways. There are also cavities and the like that are causes of depressions and the like. An underground radar device is used for the sake of surveying the presence or absence, sizes, positions and shapes of buried objects and cavities from the ground surface.

The frequency band of electromagnetic waves used for the underground radar device typically ranges from several hundred megahertz to several gigahertz. The frequency band is determined by the sizes, shapes and distances from the ground surface of buried objects that are to be explored, and the soil type. What constitutes a lifeline, for example, a buried pipe is not different with respect to the type of road (sidewalk or roadway). Consequently, the same frequency band is often used.

Accordingly, with the function of the main body of the underground radar device being as it is, an antenna for transceiving is replaced with one having a different size in conformity with the width of a road. For example, Non-Patent Literature 1 discloses multiple transceiver antennas having different widths.

For example, Patent Literature 1 discloses an exploration method that uses a transceiver antenna having a width smaller than the width of the road to scan while displacing a line to be explored, and combines multiple scanned results.

CITATION LIST

Patent Literature

Patent Literature 1: Japanese Patent No. 3936472

Non-Patent Literature

Non-Patent Literature 1: Multi-Channel, Ground-Coupled Antenna Arrays for GPR. [retrieved May 11, 2018], Internet (URL: http://WWW.3d-radar.com/?page id=51)

SUMMARY OF THE INVENTION

Technical Problem

However, the method disclosed in Non-Patent Literature 1 requires purchasing multiple types of antennas in conformity with the widths of roads. Accordingly, the initial installation cost is high. Furthermore, it is required to replace the antenna for transceiving in conformity with the width of the road to achieve adjustment. Accordingly, the work efficiency is low.

The method disclosed in Patent Literature 1 requires multiple times of exploration. Accordingly, the work efficiency is low. As described above, the conventional underground radar device and the method thereof have a problem in that the work efficiency is low.

The present invention has been made in view of this problem, and has an object to provide an underground radar device and a method thereof that do not require replacement of antennas for transceiving in conformity with the width of the road, can explore a buried object with a single scan, and improve the work efficiency.

Means for Solving the Problem

An underground radar device according to an aspect of this embodiment has a gist that the underground radar device includes a transmission array antenna and a reception array antenna, and further includes a position variable mechanism capable of changing intervals between antenna elements of the transmission array antenna and the reception array antenna while keeping all the intervals equal.

An underground exploration method according to an aspect of this embodiment has a gist that the underground exploration method executed by the underground radar device can explore underground by changing intervals between antenna elements of the transmission array antenna and the reception array antenna while keeping all the intervals equal.

Effects of the Invention

The present invention can provide an underground radar device and a method thereof that do not require replacement of antennas for transceiving in conformity with the width of the road, and can explore a buried object with a single scan and improve the work efficiency.

DESCRIPTION OF EMBODIMENTS

Embodiments of the present invention are hereinafter described with reference to the drawings. The same elements among diagrams are assigned the same reference signs. The description thereof is not repeated.

Figure 1:
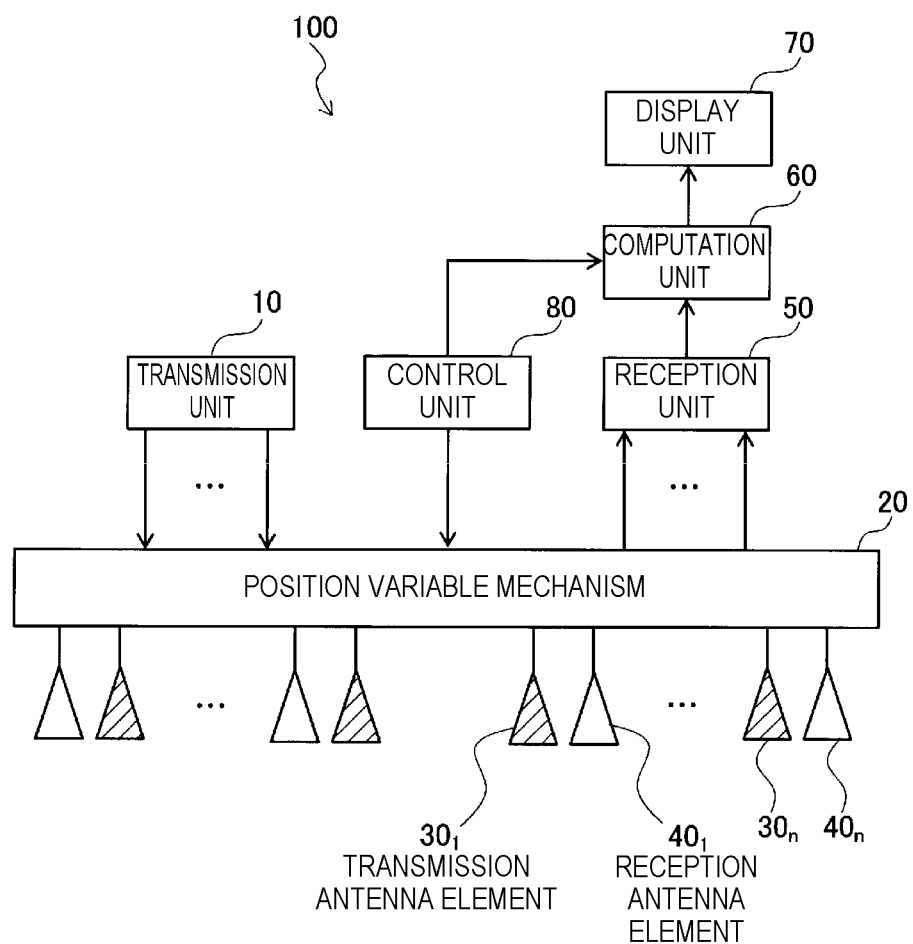
FIG. 1 shows a functional configuration example of an underground radar device according to an embodiment of the present invention.

FIG. 1 shows a functional configuration example of an underground radar device according to an embodiment of the present invention. The underground radar device 100 shown in FIG. 1 is a device that explores a buried object using electromagnetic waves.

The underground radar device 100 includes a transmission unit 10, a position variable mechanism 20, a plurality of transmission antenna elements $30_1$ to $30_n$, a plurality of reception antenna elements $40_1$ to $40_n$, a reception unit 50, a computation unit 60, and a display unit 70. The plurality of transmission antenna elements $30_1$ to $30_n$ and the plurality of reception antenna elements $40_1$ to $40_n$ are arranged in a line to constitute an array antenna. Hereinafter, when the arranged array antenna is indicated, the plurality of transmission antenna elements $30_1$ to $30_n$ is called a transmission array antenna 30, and the plurality of reception antenna elements $40_1$ to $40_n$ is called a reception array antenna 40. Alternatively, in some cases, the plurality of transmission antenna elements $30_1$ to $30_n$ and the plurality of reception antenna elements $40_1$ to $40_n$ are collectively called a transceiver antenna. In the cases where the elements are called the transceiver antenna, representation of reference signs is omitted.

The functional configuration units other than the position variable mechanism 20, the transmission array antenna 30 and the reception array antenna 40 can be achieved by a computer including ROMs, RAMS, and CPUs, for example. In the case where the functional configuration units are achieved by the computer, processing details of the functions to be included in the functional configuration units are described in programs.

The underground radar device 100 is different from the conventional underground radar device in that the device 100 includes the position variable mechanism 20. Accordingly, the position variable mechanism 20 is described in detail.

First Embodiment (Position Variable Mechanism)

Figure 2:
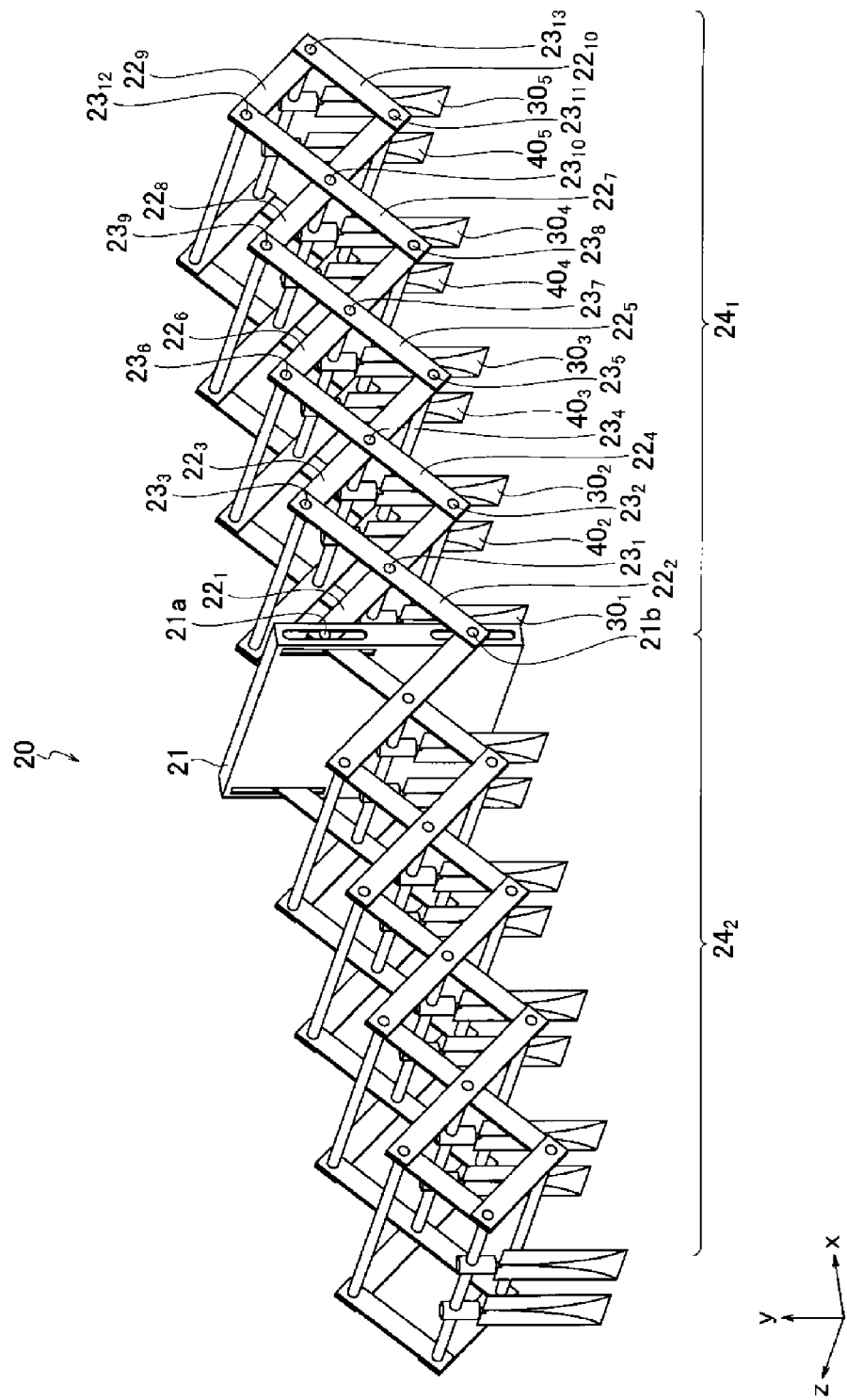
FIG. 2 is a perspective view showing a specific example of a position variable mechanism according to a first embodiment of the underground radar device shown in FIG. 1.

FIG. 2 is a perspective view of a specific example of the position variable mechanism 20 according to a first embodiment of the present invention. The position variable mechanism 20 is a mechanism that can change the distances between the antenna elements of the transmission array antenna 30 and the reception array antenna 40 while keeping all the intervals equal.

As shown in FIG. 2, the position variable mechanism 20 includes a drive unit 21, multiple crossbars 22, and multiple link sections 23, and is constituted by expandable links $24_1$ and $24_2$ that expand and contract in a lateral direction centered at the drive unit 21. The lateral direction is assumed as an x direction. The vertical direction is assumed as a y direction. The depth direction orthogonal to the x-y plane is assumed as a z direction. In this example, the expandable links $24_1$ and the expandable links $24_2$ are symmetrical (bilaterally symmetrical) with respect to the x direction centered at the drive unit 21.

In FIG. 2, reference signs are represented only for components constituting the expandable link $24_1$ in the +x direction; the configuration thereof is described. The expandable links $24_2$ in the −x direction has the same configuration as the expandable links $24_1$. Accordingly, description thereof is omitted.

The drive unit 21 can change the interval between a first pivot 21a and a second pivot 21b that are vertically arranged. The drive unit 21 rotates an internal motor (not shown) on the basis of a drive signal input from a control unit 80 to change the interval between the first pivot 21a and the second pivot 21b.

A third pivot 21c (not shown) and a fourth pivot 21d (not shown) are provided on a surface of the drive unit 21 opposite to the surface where the first pivot 21a and the second pivot 21b are provided. As in the case of the first pivot 21a and the second pivot 21b, the third pivot 21c and the fourth pivot 21d can change their intervals on the basis of the drive signal from the control unit 80. The interval between the third pivot 21c and the fourth pivot 21d is the same as the interval between the first pivot 21a and the second pivot 21b.

The expandable links $24_1$ includes multiple crossbars $22_1$ to $22_{10}$ and multiple link sections $23_1$ to $23_{13}$.

One end of the crossbar $22_1$ is connected to the upper first pivot 21a such that the crossbar $22_1$ forms a slope face of a V-shape in an obliquely downward direction. One end of the crossbar $22_2$ is connected to the lower second pivot 21b such that the crossbar $22_2$ forms a slope face of an inverted V-shape and intersects with the midpoint of the crossbar $22_1$.

The crossbar $22_1$ and the crossbar $22_2$ are coupled to each other by the link section $23_1$, at a part where these crossbars intersect, such that the angles of the slope face of the V-shape of the crossbar $22_1$ and the slope face of the inverted V-shape of the crossbar $22_2$ can be changed. Accordingly, when the interval between the first pivot 21a and the second pivot 21b is small, the slopes of the V-shape and the inverted V-shape are low, and the position of the link section $23_1$ gets away from the drive unit 21. When the interval between the first pivot 21a and the second pivot 21b is large, the slopes of the V-shape and the inverted V-shape are high, and the position of the link section $23_1$ is near to the drive unit 21.

The other end of the crossbar $22_1$ is coupled to one end of the crossbars $22_3$ at the link section $23_2$, and forms the bottom of the first V-shape counted from the drive unit 21. The other end of the crossbars $22_2$ is coupled to one end of the crossbars $22_4$ at the link section $23_3$, and forms the crest of the first inverted V-shape counted from the drive unit 21.

That is, the crossbar $22_3$ forms the second inverted V-shape counted from the drive unit 21, and has the one end coupled to the other end of the crossbar $22_1$ so as to be in parallel with the crossbar $22_2$. The crossbar $22_4$ forms the second V-shape counted from the drive unit 21, and has the one end coupled to the other end of the crossbar $22_2$ so as to be in parallel with the crossbar $22_1$.

The crossbar $22_3$ and the crossbar $22_4$ are coupled to each other by the link section $23_4$, at a part where these crossbars intersect, such that the angle of the slope face of the inverted V-shape of the crossbar $22_3$ and the slope face of the V-shape of the crossbar $22_4$ can be changed. As in the case of the link sections $23_1$ at the first intersecting portion counted from the drive unit 21, the position of the link sections $23_4$ at the second intersecting portion counted from the drive unit 21 approaches or gets away in conformity with the interval between the first pivot 21a and the second pivot 21b.

Likewise, hereinafter, the third V-shape counted from the drive unit 21 is formed by the crossbar $22_6$ having one end coupled to the other end of the crossbar $22_3$, and the crossbar $22_7$ coupled to the other end of the crossbar $22_6$ at the link section $23_8$. The third inverted V-shape counted from the drive unit 21 is formed by the crossbar $22_5$ having one end coupled to the other end of the crossbar $22_4$, and the crossbar $22_8$ coupled to the other end of the crossbar $22_5$ at the link section $23_9$.

The intersecting portions of the crossbar $22_5$ forming the third inverted V-shape counted from the drive unit 21, and the crossbar $22_6$ forming the third V-shape counted from the drive unit 21 are coupled to each other by the link section $23_7$. As in the case of the link sections $23_1$ and the link section $23_4$, the position of the link section $23_7$ approaches and gets away from the drive unit 21 in conformity with the interval between the first pivot 21a and the second pivot 21b.

The description of the crossbars $22_5$ and $22_6$ and the link section $23_9$ and thereafter is repetition of that described above. Accordingly, the description is omitted. Hereinafter, if there is no need to specify the positions of the crossbars and the link sections, representation of subscripts of reference signs is omitted.

As described above, the crossbars 22 are coupled by the link sections 23, thereby allowing the expandable link $24_1$ to be expanded. If it is assumed that there is no loss of the force at the link sections 23 due to friction, the length of the expandable links $24_1$ can be endlessly expanded.

The position variable mechanism 20 according to this embodiment can change the intervals between the bottoms of the valleys of the V-shapes and the crests of the inverted V-shapes formed by the crossbars 22, and the intervals between the portions where the crossbars 22 intersect with each other, while keeping the intervals equal.

As shown in FIG. 2, at the positions of the link sections $23_1$, $23_4$, $23_7$, $23_{10}$ and $23_{13}$ of the expandable link $24_1$ of the position variable mechanism 20, the transmission antenna elements $30_1$, $30_2$, $30_3$, $30_4$ and $30_5$ and the reception antenna elements $40_1$, $40_2$, $40_3$, $40_4$ and $40_5$ are arranged, thus constituting the transmission array antenna 30 and the reception array antenna 40. This similarly applies to the expandable link $24_2$.

Figure 3:
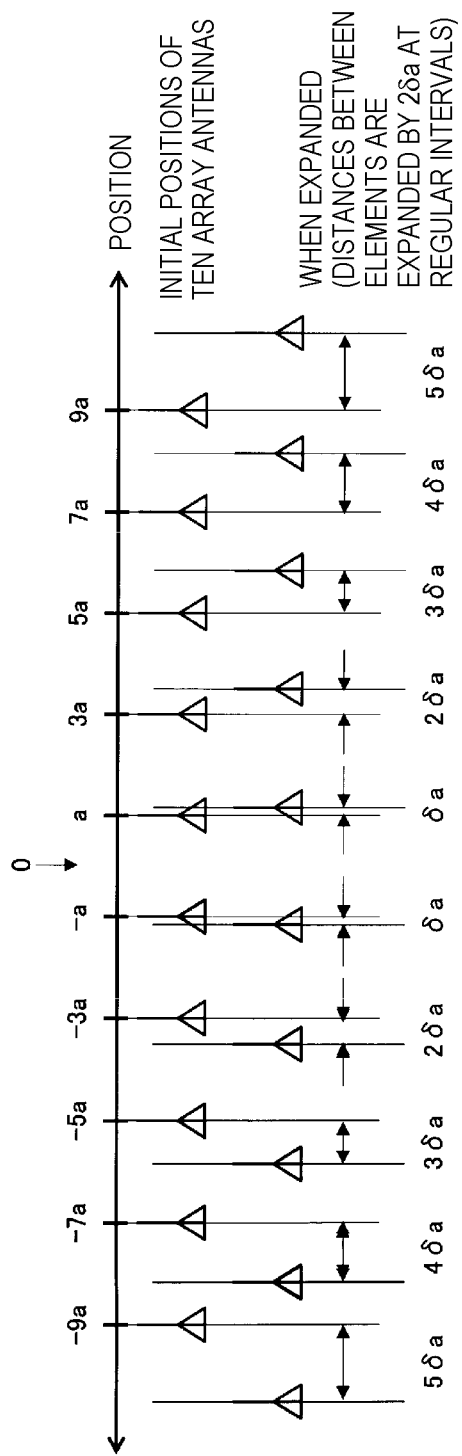
FIG. 3 schematically shows an example where the position of a transmission antenna shown in FIG. 1 is changed.

FIG. 3 schematically shows situations where with the configuration of the transmission array antenna 30 and the reception array antenna 40 as described above, the intervals of the antenna elements are changed while keeping the intervals equal. In FIG. 3, "a" corresponds to the link sections $23_1$, 3a corresponds to the link section $23_4$, 5a corresponds to the link section $23_7$, 7a corresponds to the link section $23_{10}$, and 9a corresponds to the link section $23_{13}$. 0 represents the position of the drive unit 21.

An upper Δ row shown in FIG. 3 represents the positions of the antenna elements in a case where the interval between the first pivot 21a and the second pivot 21b of the drive unit 21 is set to a value (interval) within their movable range. A lower Δ row represents the positions of the antenna elements in a case where the intervals of the antenna elements are expanded outward by 26a in comparison with the case of the upper row.

The upper Δ positions and the lower Δ positions can be reversibly set by changing the interval between the first pivot 21a and the second pivot 21b of the drive unit 21. To move the antenna element from the upper Δ position to the lower Δ position, the interval between the first pivot 21a and the second pivot 21b is reduced. In the reverse case, the interval between the first pivot 21a and the second pivot 21b is increased.

As described above, the position variable mechanism 20 according to this embodiment can change the intervals between the antenna elements of the transmission array antenna 30 and the reception array antenna 40 in conformity with the width of a road while keeping all the intervals equal. Consequently, there is no need to prepare antennas for transceiving in conformity with the widths of roads. Furthermore, there is no need to replace antennas for transceiving in conformity with the width of a road. Consequently, a single scan by the underground radar device 100 can explore a buried object, and improve the work efficiency.

FIG. 2 shows the example where an expandable link (without a reference sign) having the same shape of the expandable links $24_1$ is expanded from the third pivot 21c (not shown) and the fourth pivot 21d (not shown) provided on the surface opposite to the surface of the drive unit 21 where the first pivot 21a and the second pivot 21b are provided, and the link sections 23 of the expandable link concerned and the expandable link $24_1$ are coupled by link rods. The expandable link represented without a reference sign is not necessarily provided.

That is, the position variable mechanism 20 may be configured only by the expandable links $24_1$ (and the expandable links $24_2$). In this case, the transmission antenna elements $30_1$ to $30_5$ and the reception antenna elements $40_1$ to $40_5$ are arranged for example at the bottoms $23_2$, $23_5$, $23_8$ and $23_{11}$ of the V-shapes of the expandable links $24_1$.

As described above, the position variable mechanism 20 according to this embodiment includes: the drive unit 21 capable of changing the interval between the vertically arranged first pivot 21a and second pivot 21b; the multiple crossbars 22 which have one ends thereof connected to the first pivot 21a and the second pivot 21b to form the V-shape and the inverted V-shape, in which the one ends are respectively connected to another end forming the V-shape and another end forming the inverted V-shape, and which constitute the expandable links $24_1$ and $24_2$ expanding and contracting by changing the inclination angles of the V-shape and the inverted V-shape in conformity with the interval between the first pivot 21a and the second pivot 21b; and the multiple link sections 23 that couple intersecting portions where the crossbars intersect, and two crossbars 22 at each portion forming the bottom of the V-shape and the crest of the inverted V-shape so as to allow the inclination angles of the V-shape and the inverted V-shape to be changed. The antenna elements are arranged at the respective link sections 23.

This negates the need to replace the transmission array antenna 30 and the reception array antenna 40 of the underground radar device 100 in conformity with the width of a road. A buried object can be explored by a single scan. Accordingly, the work efficiency of underground exploration can be improved. Since there is no need to prepare multiple antennas for transceiving in conformity with the road, the cost for exploration by the underground radar device can be reduced.

Modified Example 1

Figure 4:
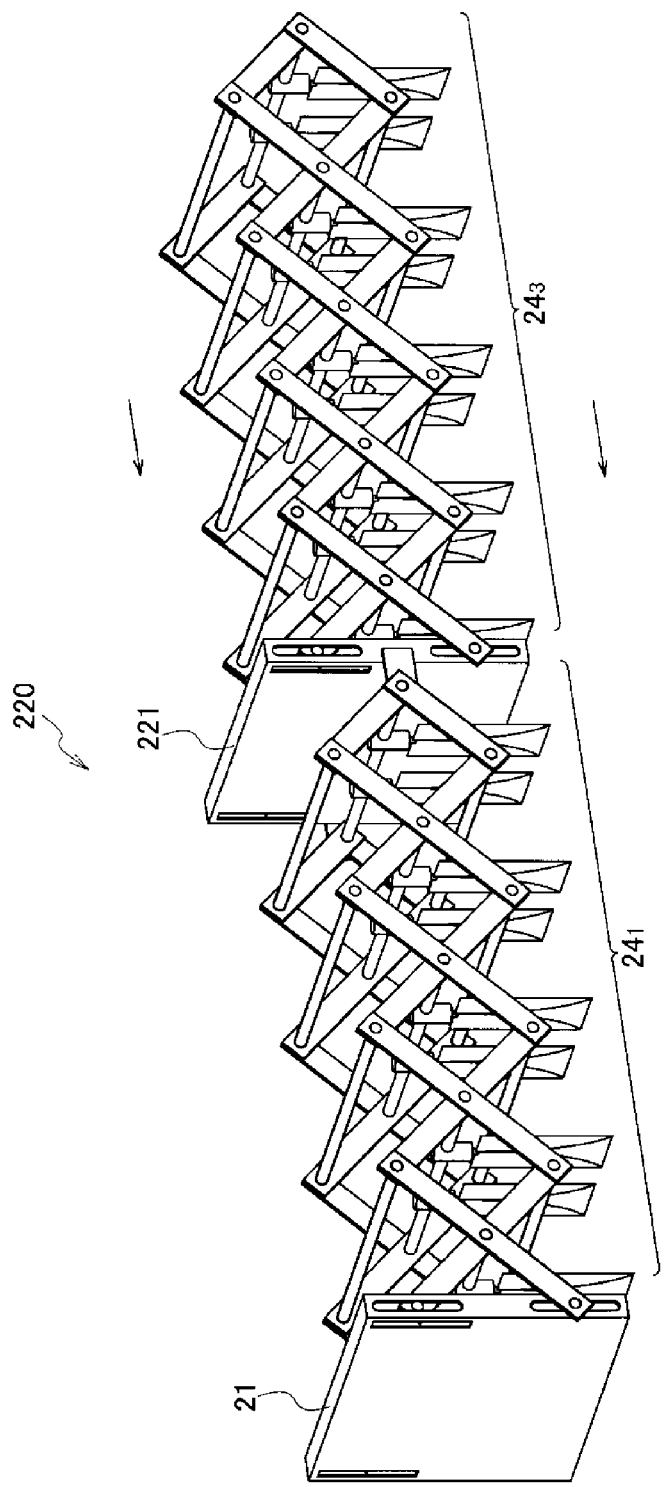
FIG. 4 is a perspective view showing a part of the position variable mechanism of a modified example that includes multiple drive units.

In the aforementioned embodiment, the description has been made on the example of including the single drive unit 21. Alternatively, multiple drive units 21 may be provided. FIG. 4 is a perspective view showing a part of a position variable mechanism 220 of a modified example that includes multiple drive units.

The position variable mechanism 220 in a modified example 1 shown in FIG. 4 is different in that a second drive unit 221 is included for the position variable mechanism 20. The drive unit 21 and the second drive unit 221 are connected by the expandable links $24_1$. Consequently, by changing the interval between the first pivot 21a and the second pivot 21b of the drive unit 21, the interval between the drive unit 21 and the drive unit 221 can be changed.

In the x direction of the drive unit 221, an expandable link $24_3$ including multiple crossbars is further connected. The expandable link $24_3$ is expanded and contracted by the drive unit 221.

As described above, the drive unit may be provided for each expandable link including a predetermined number of crossbars. According to this configuration, the intervals of the antenna elements of the transmission array antenna 30 can be changed for individual expandable links, for example. That is, various antenna arrangement can be achieved.

The expandable link $24_1$, the expandable link $24_3$ and the drive unit 221 are affected by the gravity, and are sometimes lowered in the −y direction accordingly. To prevent this, it is preferable to provide rails (not shown) that hold them in the vertical direction.

Modified Example 2

Figure 5:
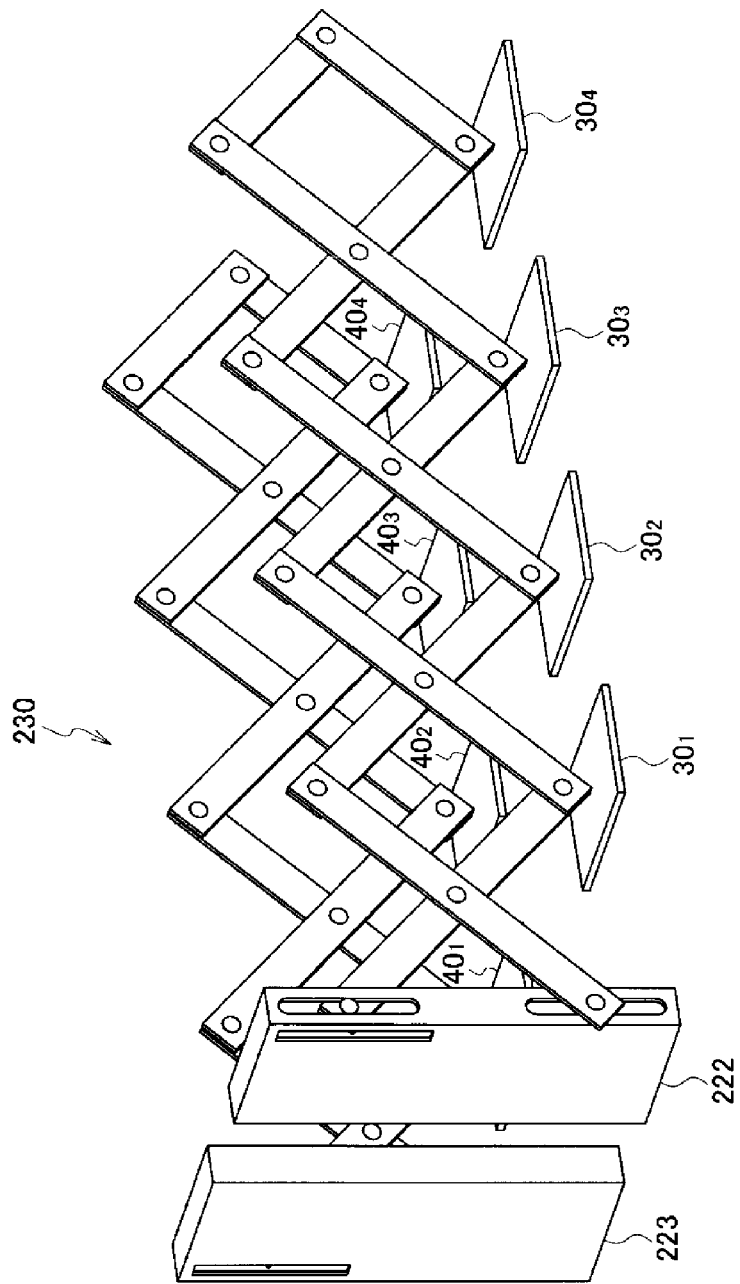
FIG. 5 is a perspective view showing a part of the position variable mechanism of another modified example that includes multiple drive units.

FIG. 5 is a perspective view showing a part of a position variable mechanism 230 of another modified example that includes multiple drive units. The position variable mechanism 230 in a modified example 2 shown in FIG. 5 can separately change the intervals between the antenna elements of the transmission array antenna 30 and the reception array antenna 40, for example.

The transmission antenna elements $30_1$ to $30_4$ and the reception antenna elements $40_1$ to $40_4$ shown in FIG. 5 are shown according to an example of patch antennas. The transceiver antenna shown in FIG. 2 is shown according to an example of tapered slot antennas. As clearly indicated by reference signs, the tapered slot antennas and the patch antennas have different shapes but the same operation.

As shown in FIG. 5, the intervals between the transmission antenna elements $30_1$ to $30_4$ can be changed by a drive unit 222. The intervals between the reception antenna elements $40_1$ to $40_4$ can be changed by the drive unit 223.

The intervals between the antenna elements of the transmission array antenna 30 and the reception array antenna 40 may be separately changed.

Second Embodiment

Figure 6:
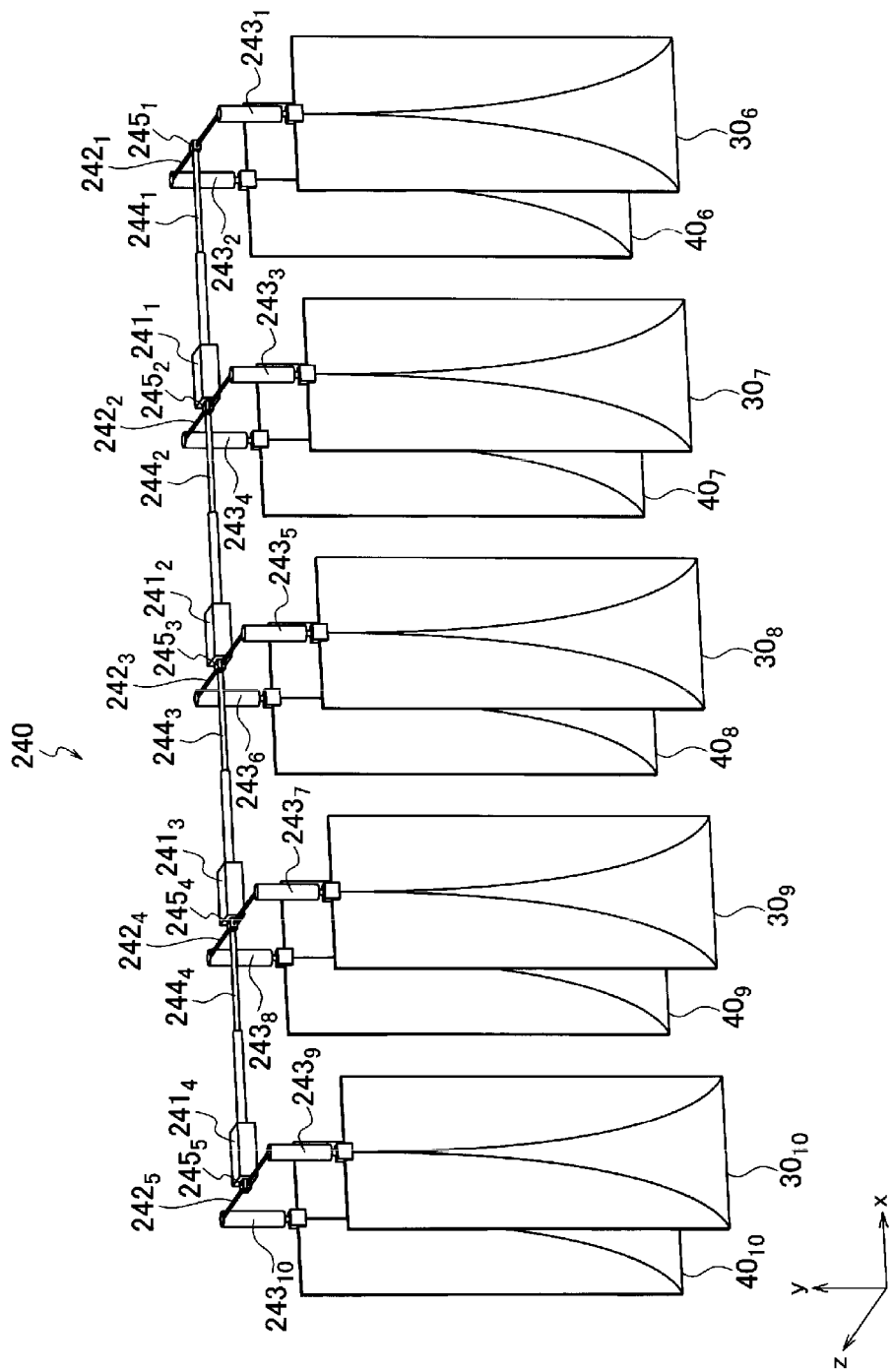
FIG. 6 is a perspective view of a part of a specific example of a position variable mechanism according to a second embodiment of the underground radar device shown in FIG. 1.

FIG. 6 is a perspective view showing a part of a specific example of a position variable mechanism according to a second embodiment of the underground radar device 100 of the present invention. A position variable mechanism 240 shown in FIG. 6 is shown according to an example where four electric actuators $241_1$ to $241_5$ are connected in series, for example. FIG. 6 is for the sake of an object to show a configuration of capable of expanding and contracting. There is no corresponding relationship with the position variable mechanism described above.

The electric actuator $241_1$ can expand and contract in the longitudinal direction (x). Expansion and contraction are achieved by an extension section $244_1$ expanding and contracting from and into a main body of the electric actuator $241_1$ as with a piston. The opposite ends in the expansion and contraction direction are provided with rod-shaped antenna holder sections $242_1$ and $242_2$ in an orthogonal direction (z).

The opposite ends of the antenna holder section $242_1$ in the z direction on the extension section $244_1$ side (root) are provided with rotation sections $243_1$ and $243_2$. A transmission antenna element $30_6$ is arranged at a distal end portion of the rotation section $243_1$ in the −y direction. A reception antenna element $40_6$ is arranged at a distal end portion of the rotation section $243_2$ in the −y direction. In this example, the strip-shaped transmission antenna element $30_6$ and reception antenna element $40_6$ are arranged in a direction parallel to the longitudinal direction of the electric actuator $241_1$.

As in the case of the extension section $244_1$ side, the antenna holder section $242_2$, the rotation section $243_3$, the rotation section $243_4$, the transmission antenna element $30_6$, and the reception antenna element $40_6$ are also arranged on the main body side (distal end) of the electric actuator $241_1$.

Expansion and contraction of the extension section $244_1$ from and into the main body of the electric actuator $241_1$ as with the piston can change the interval between the transmission antenna elements $30_6$ and $30_7$. In the case of this example, the interval between the reception antenna elements $40_6$ and $40_7$ are simultaneously changed with the same width as the transmission antenna elements $30_6$ and $30_7$.

Multiple connections of the configurations described above in series can set the interval between the antenna elements of the transmission array antenna 30 and the reception array antenna 40 to any interval. The plurality of electric actuators 241 are coupled via the link sections. For example, an LA33 actuator of LINAK K.K. can be adopted as the electric actuator 241.

As described above, the position variable mechanism 240 may include the plurality of electric actuators 241 that expand and contract, and the link section connecting the electric actuator 241. The actuator may be driven by oil pressure or air pressure. The drive source is not limited to electric one.

Figure 7:
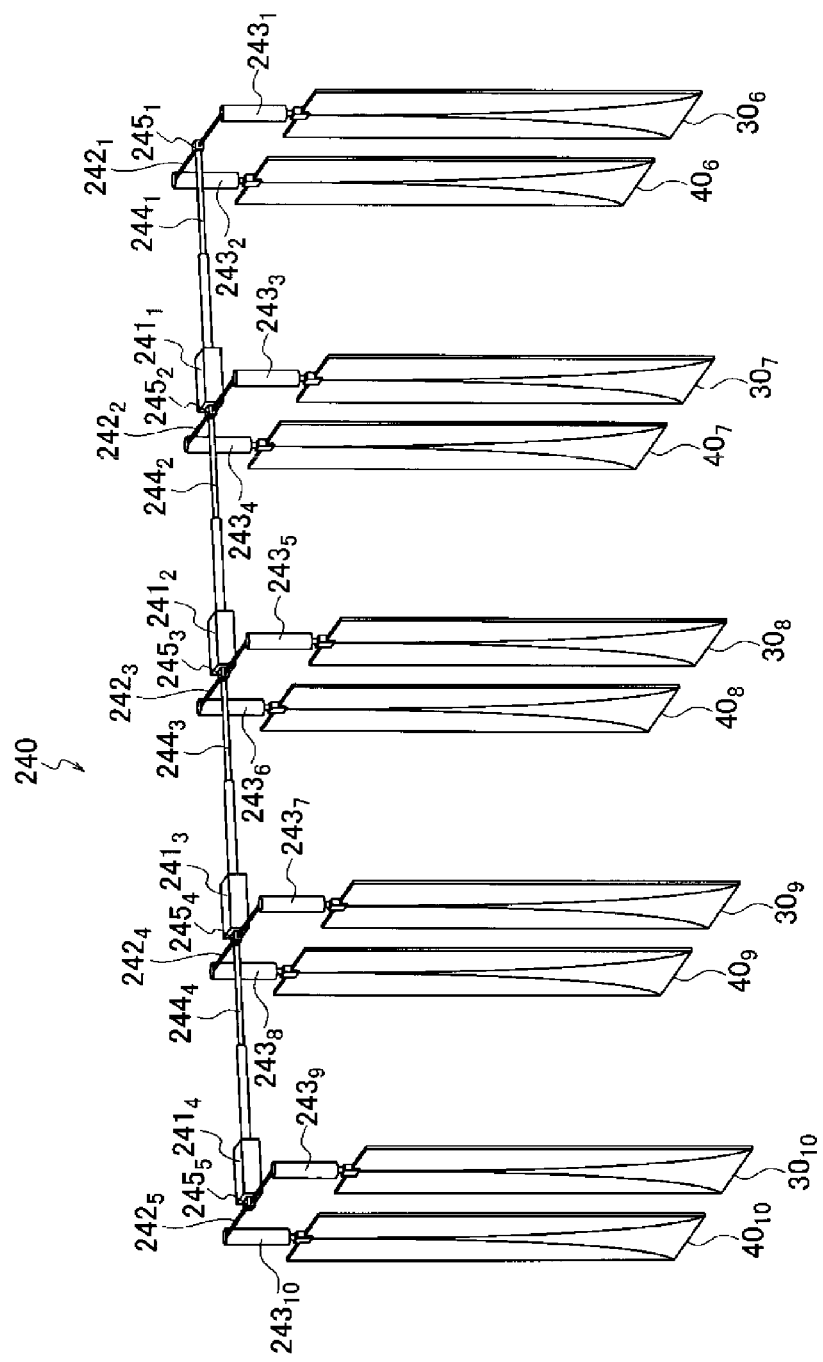
FIG. 7 is a perspective view showing an example where each antenna element shown in FIG. 6 is rotated by 90 degrees.

The directions of the antenna elements of the transmission array antenna 30 and the reception array antenna 40 shown in FIG. 6 may be changed. FIG. 7 is a perspective view showing an example where each antenna element shown in FIG. 6 is rotated by 90 degrees. As described above, the polarized wave direction of electromagnetic waves emitted from each antenna element may be changed.

The change of the polarized wave direction may be fixed in a direction having been once set. Alternatively, for example, the rotation section 243 described above may be rotated by a motor, thus achieving continuous rotation. The idea of changing the polarized wave direction can be applied, as it is, to the phase variable mechanism 20 (first embodiment).

That is, the antenna elements are arranged at the respective link sections via the rotation sections that rotate the respective antenna elements. This allows exploration, with the polarized wave direction of electromagnetic waves emitted from each antenna element being changed.

(Underground Exploration Method)

Figure 8:
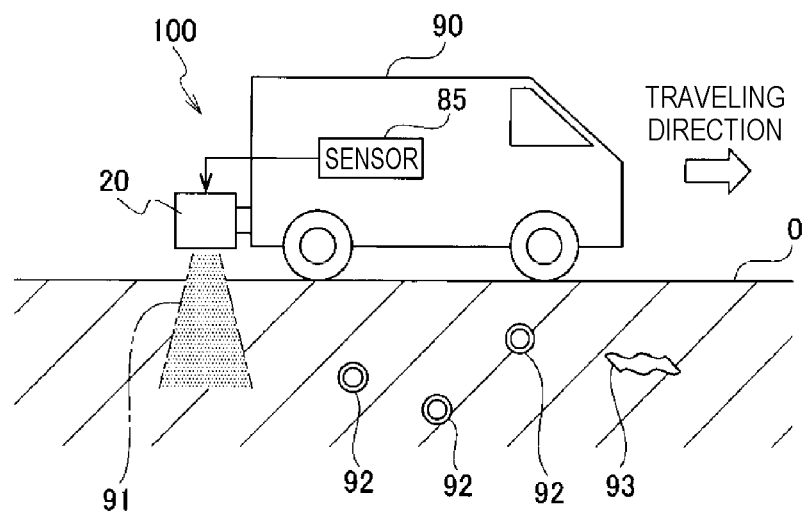
FIG. 8 schematically shows a method of exploring a buried object using the underground radar device shown in FIG. 1.
Figure 9:
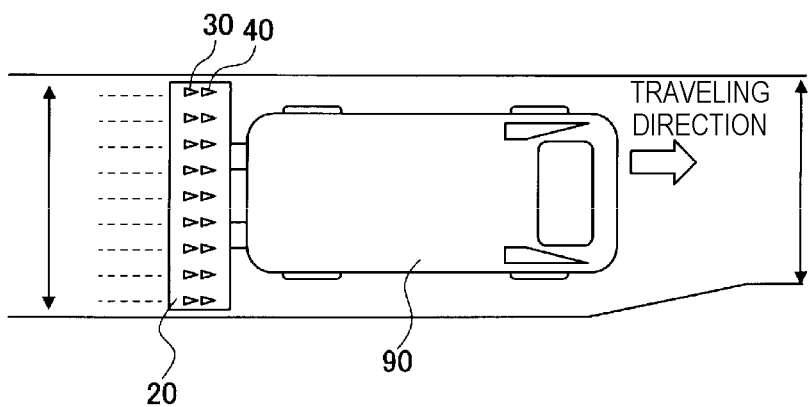
FIG. 9 schematically shows situations of the method of exploring a buried object shown in FIG. 8 in plan view.

FIGS. 8 and 9 schematically show situations where a buried object in a road is explored using the underground radar device 100 according to the first embodiment of the present invention. FIG. 8 is a diagram of the situations viewed from a side. FIG. 9 is a plan view of the situations.

FIG. 8 shows situations where the underground radar device 100 is mounted on a vehicle 90, the position variable mechanism 20 and the antenna are provided, protruding from the rear of the vehicle 90, and a buried object is explored while the vehicle 90 travels. Electromagnetic waves 91 are emitted from the transmission array antenna 30 toward the ground surface 0, and reflected waves from a buried pipe 92 and a cavity 93 are received by the reception array antenna 40. In this case, as shown in FIG. 9, the position variable mechanism 20 is set to have a width in conformity with the width of a road, and the antenna elements are arranged at regular intervals.

Movement means of the underground radar device 100 is not limited to a vehicle. The device may be mounted on a pushing cart and may be moved by pushing the cart, or may be mounted on a pulling cart and may be moved by pulling the cart. The width of the road decreases along the vehicle traveling direction. Accordingly, as the vehicle travels, the width of the position variable mechanism 20 decreases in conformity with the width of the narrowed road (not shown). Even in this case, the antenna elements are arranged at regular intervals by the underground radar device 100.

As described above, the underground exploration method executed by the underground radar device 100 according to this embodiment can change the intervals between the antenna elements of the transmission array antenna 30 and the reception array antenna 40 while keeping all the intervals equal, and explores.

The underground radar device 100 may include a sensor 85 (FIG. 8) that detects the width of the road. The sensor 85 is a camera that takes an image of the vehicle 90 in the traveling direction, or images on both the sides of the vehicle 90, for example, and detects the width of the road. Based on sensor information (the width of the road) detected by the sensor 85, the intervals of the antenna elements of the position variable mechanism 20 are controlled through the control unit 80. The width of the road is thus detected, and the intervals between the antenna elements of the transmission array antenna 30 and the reception array antenna 40 may be automatically changed in conformity with the width of the road.

As described above, the underground radar device and a method thereof according to this embodiment can explore a buried object with a single scan even if the width of the road varies. Consequently, the work efficiency of the underground exploration method can be improved. This also negates the need to prepare multiple transceiver antennas having various widths. Accordingly, the initial installation cost related to underground exploration can be reduced.

The example where the position variable mechanism 20 or the like is constituted by the expandable links 24, and the example where the mechanism is constituted by the electric actuators 241 have been described as specific examples. Any configuration may be adopted only if the intervals between the antenna elements of the transmission array antenna 30 and the reception array antenna 40 can be changed while keeping all the intervals equal.

The example where five transceiver antennas are arranged for one expandable link 24 has been described. However, the number of antenna elements is not limited to that in this example. Any number that is two or more may be adopted. The drive unit 21 has been described according to the electrically drive example, for instance. Alternatively, the drive source is not necessarily included. The interval between the first pivot 21a and the second pivot 21b may be manually set by an operator, thereby changing the intervals between the antenna elements of the transceiver antennas while keeping all the intervals equal.

As described above, it is a matter of course that the present invention encompasses various embodiments and the like that are not described here. Consequently, the technical scope of the present invention is defined only by invention defining matters according to the claims that are appropriate based on the above description.

REFERENCE SIGNS LIST

10: Transmission unit
20, 220, 230, 240: Position variable mechanism
21, 221: Drive unit
21a: First pivot
21b: Second pivot
22, $22_1$ to $22_9$: Crossbar
23, $23_1$ to $23_{13}$: Link section
24, $24_1$ to $24_3$: Expandable link
30: Transmission array antenna
$30_1$ to $30_n$: Transmission antenna element
40: Reception array antenna
$40_1$ to $40_n$: Reception antenna element
50: Reception unit
60: Computation unit
70: Display unit
80: Control unit
85: Sensor
90: Vehicle
91: Electromagnetic waves
92: Buried pipe
93: Cavity
100: Underground radar device
241, $241_1$ to $241_4$: Electric actuator (actuator)
242, $242_1$ to $242_5$: Antenna holder section
243, $243_1$ to $243_{19}$: Rotation section
244, $244_1$ to $244_4$: Extension section

The invention claimed is:

1. An underground radar device, comprising a transmission array antenna, and a reception array antenna, further comprising:
    a position variable mechanism capable of changing intervals between antenna elements of the transmission array antenna and the reception array antenna while keeping all the intervals equal,
    wherein the position variable mechanism comprises:
    a drive unit capable of changing an interval between a first pivot and a second pivot that are vertically arranged;
    a plurality of crossbars which have one ends thereof connected to the first pivot and the second pivot to form a V-shape and an inverted V-shape, in which the one ends are respectively connected to another end forming the V-shape and another end forming the inverted V-shape, and which constitute an expandable link expanding and contracting by changing inclination angles of the V-shape and the inverted V-shape in conformity with the interval; and
    a plurality of link sections that couple intersection portions where the crossbars intersect, and two of the crossbars at each portion forming a bottom of the V-shape and a crest of the inverted V-shape so as to allow the inclination angles of the V-shape and the inverted V-shape to be changed, and
    wherein the antenna elements are arranged at the respective link sections.

2. The underground radar device according to claim 1, wherein the drive unit is provided for each expandable link that includes a predetermined number of the crossbars.

3. The underground radar device according to claim 2, wherein the antenna elements are arranged at the respective link sections via rotation sections that rotate the respective antenna elements.

4. The underground radar device according to claim 1, wherein the antenna elements are arranged at the respective link sections via rotation sections that rotate the respective antenna elements.

5. An underground exploration method executed by an underground radar device including a transmission array antenna and a reception array antenna, the method comprising exploring underground by changing intervals between antenna elements of the transmission array antenna and the reception array antenna using a position variable mechanism while keeping all the intervals equal,
    wherein the position variable mechanism comprises:

a drive unit capable of changing an interval between a first pivot and a second pivot that are vertically arranged;

a plurality of crossbars which have one ends thereof connected to the first pivot and the second pivot to form a V-shape and an inverted V-shape, in which the one ends are respectively connected to another end forming the V-shape and another end forming the inverted V-shape, and which constitute an expandable link expanding and contracting by changing inclination angles of the V-shape and the inverted V-shape in conformity with the interval; and a plurality of link sections that couple intersection portions where the crossbars intersect, and two of the crossbars at each portion forming a bottom of the V-shape and a crest of the inverted V-shape so as to allow the inclination angles of the V-shape and the inverted V-shape to be changed, and wherein the antenna elements are arranged at the respective link sections.

\* \* \* \* \*